United States Patent
Oddou et al.

(10) Patent No.: US 9,740,913 B2
(45) Date of Patent: Aug. 22, 2017

(54) METHOD AND DEVICE TO SPEED UP FACE RECOGNITION

(75) Inventors: Christophe Oddou, Joinville le Pont (FR); Thierry Dagaeff, L'isle (CH); Nicholas Fishwick, San Francisco, CA (US)

(73) Assignee: Nagravision S.A., Cheseaux-sur-Lausanne (CH)

( * ) Notice: Subject to any disclaimer, the term of this patent is extended or adjusted under 35 U.S.C. 154(b) by 487 days.

(21) Appl. No.: 13/992,914

(22) PCT Filed: Dec. 8, 2011

(86) PCT No.: PCT/EP2011/072174
§ 371 (c)(1),
(2), (4) Date: Aug. 26, 2013

(87) PCT Pub. No.: WO2012/076642
PCT Pub. Date: Jun. 14, 2012

(65) Prior Publication Data
US 2013/0329971 A1  Dec. 12, 2013

Related U.S. Application Data

(60) Provisional application No. 61/421,645, filed on Dec. 10, 2010.

(30) Foreign Application Priority Data

Feb. 17, 2011  (EP) .................................... 11154824

(51) Int. Cl.
*G06K 9/00* (2006.01)
*G06K 9/20* (2006.01)
(Continued)

(52) U.S. Cl.
CPC ....... *G06K 9/00221* (2013.01); *G06K 9/2018* (2013.01); *G06K 9/72* (2013.01);
(Continued)

(58) Field of Classification Search
CPC .... G06K 9/00221; G06K 9/2018; G06K 9/72; G06K 2009/3225; G06T 2207/30201
See application file for complete search history.

(56) References Cited

U.S. PATENT DOCUMENTS 6,128,398 A * 10/2000 Kuperstein ........ G07C 9/00079
                                                    382/116
6,724,368 B2 * 4/2004 Strubbe ......................... 345/158
(Continued)

FOREIGN PATENT DOCUMENTS

GB        2454916 A      5/2009
WO   WO-2008045521 A2    4/2008

OTHER PUBLICATIONS

International Search Report PCT/ISA/210 for International Application No. PCT/EP2011/072174 Dated on Dec. 8, 2011.
(Continued)

*Primary Examiner* — Katrina Fujita
(74) *Attorney, Agent, or Firm* — Harness, Dickey & Pierce, P.L.C.

(57) ABSTRACT

Method to customize an application associated with a television experience based on the recognition of users located in front of a display and in the field of view of a camera, comprising the following steps: —an initialization step during which each user is enrolled in a database of a computer system and is defined by a profile referenced by a profile ID and comprising the user name, biometric data and additional personal data, —a finding step during which a wide image, acquired by said camera is scanned to isolate at least one user's faces, to define a marking area surrounding
(Continued)

it, to memorize the position of said marking areas, —a matching step to extract the biometric data from said marking area, to match them with the biometric data of the profiles stored in the database, and to assign the detected profile ID with the marking area. While subsequent identification is requested by the application, the following steps are executed —acquiring a wide image with the camera, —extracting the areas of said image according to the marking areas, —extracting for a particular marking area the biometric data of a face, —starting the comparison of the extracted biometric data with the biometric data of the profile ID related to this marking area, and in absence of match, continuing with the other biometric data of the database until one profile is found, —transmitting the found profile ID to the application.

12 Claims, 2 Drawing Sheets

(51) Int. Cl.
*G06K 9/72* (2006.01)
*G06K 9/32* (2006.01)

(52) U.S. Cl.
CPC ........... *G06K 2009/3225* (2013.01); *G06T 2207/30201* (2013.01)

(56) References Cited

U.S. PATENT DOCUMENTS

| | | | |
|---|---|---|---|
| 8,218,080 B2* | 7/2012 | Xu et al. | 348/552 |
| 2007/0033607 A1* | 2/2007 | Bryan | 725/10 |
| 2007/0126884 A1* | 6/2007 | Xu et al. | 348/220.1 |
| 2007/0269108 A1* | 11/2007 | Steinberg | G06K 9/00234 382/173 |
| 2008/0089561 A1 | 4/2008 | Zhang | |
| 2009/0138805 A1* | 5/2009 | Hildreth | 715/745 |
| 2011/0080254 A1* | 4/2011 | Tran | G06K 9/00355 340/5.1 |
| 2012/0060176 A1* | 3/2012 | Chai et al. | 725/10 |

OTHER PUBLICATIONS

Written Opinion PCT/ISA/237 for International Application No. PCT/EP2011/072174 Dated on Dec. 8, 2011.

* cited by examiner

METHOD AND DEVICE TO SPEED UP FACE RECOGNITION

This application is the national phase under 35 U.S.C. §371 of PCT International Application No. PCT/EP2011/072174 which has an International filing date of Dec. 8, 2011, which claims priority to U.S. provisional patent application No. 61/421,645 filed Dec. 10, 2010 and to European patent application number 11154824.4 filed Feb. 17, 2011.

The present invention concerns the field of digital TV and in particular the means to recognize views in front of a television.

BACKGROUND ART

The TV experience can be improved with new interactive features taking into account the individuality of TV viewers: content recommendation, Electronic Program Guide with preferred channels, personal widget space, parental control.

In this context, it becomes important to know who is actually watching TV. To answer this question, it is foreseen to use biometric sensors to recognize householders who have originally been enrolled in the system. The benefit is twofold: some biometric technologies ensure effortless/covert identification; in addition, they usually offer a means to reliably authenticate users.

Face recognition is a very promising technology. However, a camera mounted on top of TV embraces a wide area encompassing multiple people. If a face recognition technology for video surveillance is run, several problems have to be solved:

The face recognition algorithm is computationally intensive and the CPU load is proportional to the number of people in the scene. For video-surveillance applications, the algorithm is usually run on a high-end PC whereas the TV viewer identification is supposed to run on limited CPU. If our goal is to identify all the TV viewers to provide a personalized experience for the group, the problem we have to solve is to simplify the algorithm taking into account the specifics of the scene in order to ease the integration in a CE device.

Though, it looks quite difficult to provide a personalized TV experience for a group of people since it is tough to infer a group's profile from multiple individual profiles. In addition, not all the people in the scope of the camera are interested in the TV experience. Therefore, an alternative solution is to identify a unique TV viewer who will act as a primary viewer in order to subsequently personalize the TV experience for this person only. We will assume that this primary viewer is the one who holds the remote control. The problem we have to solve is to recognize the face of the person holding the remote control.

DISCLOSURE OF INVENTION

The aim of the invention is reached with a method to customize an application associated with a television experience based on the recognition of users located in front of a display and in the field of view of a camera. This method comprises the following steps:
an initialization step during which each user is enrolled in a database of a computer system and is defined by a profile referenced by a profile ID and comprising the following data:
a user name,
biometric data of said user acquired by said camera through a face recognition process,
additional personal data of said user,
a finding step during which a wide image, acquired by said camera and embracing a wide area to encompass all potential users located in front of said display, is scanned in order to:
isolate at least one user's faces appearing on said wide image,
define a marking area surrounding each isolated face,
memorize the position of each of said marking areas in a register that identify said marking areas,
a matching step during which each marking area is processed in order to:
extract biometric data of the face appearing inside said marking area,
match said extracted biometric data with the biometric data of the profiles stored in the database, and assigning the detected profile ID with the marking area,
while subsequent identification is requested by the application, executing the following steps:
acquiring a wide image with the camera,
extracting from the wide image an active area according to the marking area,
extracting for the active area the biometric data of a face,
starting the comparison of the extracted biometric data with the biometric data of the profile ID related to this marking area, and in absence of match, continuing with the other biometric data of the database until one profile is found,
transmitting the found profile ID to the application.

Further steps could include that, in the case of no match during subsequent identifications, the found profile ID related to the marking area is updated. Preferably, such an updating will be made in case the same profile ID has been detected at several times.

Other optional steps and embodiments are disclosed in the following description of the invention.

BRIEF DESCRIPTION OF THE FIGURES

The present invention will be better understood thanks to the attached figures in which:
the FIG. 1 illustrates the position of a viewer
the FIG. 2 illustrates the division of the scene into areas
the FIG. 3 illustrates the wave length of the IR emitter
the FIG. 4 illustrates the blue point of the remote control

DESCRIPTION OF THE INVENTION

Figure 1:
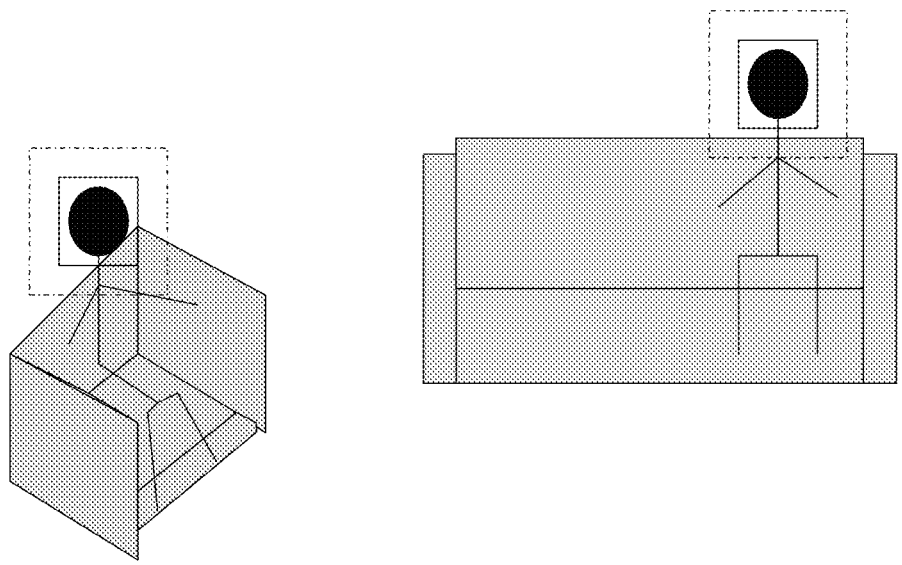

According to the preferred embodiment of this invention, the method firstly aims to enroll each user in a database of a computer system during an initialization step in which each user is defined by a profile referenced by a profile ID. Typically, the user's profile comprises several data such as the user name, biometric data of the user and additional personal data.

The biometric data of the enrolled users can be acquired by using face recognition technologies.

People that want to be recognized by the computer system are enrolled by means of a snapshot of their face taken by a camera. For instance a mug shot is captured and the related biometric data are stored in a database within the user's profile together with the identity of the person and, preferably with additional data specific to the user.

Once the enrolment is done, the method further comprises two main steps, namely a finding step and a matching step.

The finding step consists in scanning a wide image in search of faces. The image encompasses the front of the television and thus is able to take all persons currently watching TV. The image is processed to isolate faces and then, once a face is localized, a marking are (i.e. a rectangle) containing the face is cropped and its position is memorized in a register that identify the marking areas related to the faces of these persons.

The matching step compares the biometric data of the faces with corresponding data recorded in the database. Once the biometric data of a face recorded in the database is detected as being sufficiently close to the biometric data of the detected face, the identity of the person is provided.

To this end, each marking area is processed in order to read the biometric data appearing within the marking area. Then, these data are compared with those of the profiles stored in the database and finally the detected profile ID is assigned to the marking area so as to establish a link between the marking area and the person related to this area.

The claimed solution is executed thanks to a device comprising a memory, in which the program containing the above method is stored, a processing unit that execute the program and carry out the acquisition step, comparison step, matching step and detection step, and a communication channel with an application in relation to a television experience. This device can be standalone, for example integrated in the camera or being part of a television or being implemented into a set-top-box.

One solution to reduce the CPU requirement when executing this method on a STB or a TV is obviously to reduce the frame rate i.e. treat 1 frame per second. However, it is likely that the frame is not usable for face recognition because the TV viewer is moving and/or the head is not in upfront position. Instead of sub-sampling the video frames, other solutions take benefit of the specifics of the scene.

Indeed, one can claim that people watching TV usually seat on sofa or chairs that are often put on a fixed position. If we introduce this assumption in the present method, we can limit the scanning to a reduced portion of the scene which could be defined as follows:

At the very first scanning (initialization), the scanning is necessarily exhaustive. Once a face is localized and a cropped rectangle containing the face is extracted, a larger rectangle centred on the former rectangle is marked in a fast scanning area bitmap so as to subsequently instruct the finding step in nominal mode.

Therefore, in nominal mode, the scanning may be, for instance, limited to this limited area. However, as we cannot exclude that somebody appears in an unexpected area of the image or the furniture is moved, the exhaustive scanning will be preferably completed from time to time (e.g. 1 image every 10) in order to check that the system has not missed anybody. If so, the fast scanning area bitmap is updated with the new face position.

The following FIG. 1 illustrates the definition of the fast scanning area; the dotted line rectangles represent the resulting area.

In addition, one can claim that people in a family usually sit at the same position i.e. on the same piece of furniture. If we introduce this second assumption in the matching algorithm, we can improve the recognition speed since each cropped face provided by the finding step will be first matched against the most likely viewer, given the position of the cropped face. If it happens that the computed distance between both biometric data is too high, the algorithm further tries the other records of the enrolment database.

To this end, the method of the present invention suggests at least one subsequent identification of the persons located in the field of view of the camera. Such a subsequent identification may be requested by the application and the following steps could be executed:
 acquiring a new wide image with the camera,
 extracting from the wide image an active area according to the marking area,
 extracting for the active area the biometric data of a face,
 starting the comparison of the extracted biometric data with the biometric data of the profile ID related to this marking area, and in absence of match, continuing with the other biometric data of the database until one profile is found,
 transmitting the found profile ID to the application.

Considering now the memorization of the likeliest identity, one simple solution consists in logging the latest position (e.g. coordinates of the centre of the marking area) of each recognized person. Thus, at the next time the matching algorithm is run, the detected face is first matched against the face of the person who sat at the nearest position. That can be made by updating the found profile ID related to the marking area in case no match could be established during subsequent identification of persons.

Another alternative could be to compute statistics rather than keeping the last position. Indeed, if we look at the past positions of the face for a given viewer, it is likely that a cloud of points will appear at some area of the image whereas a few points will be isolated. If we overlay a grid on the image, we can consider that the default position of a TV viewer is the centre of the square which contains the highest amount of points.

Note that each point actually represents the average position of a TV viewer during a viewing session (a viewing session starts when a person has been recognized in the scene for a certain time e.g. 1 minute and it ends when a person has disappeared for this same duration).

Figure 2:
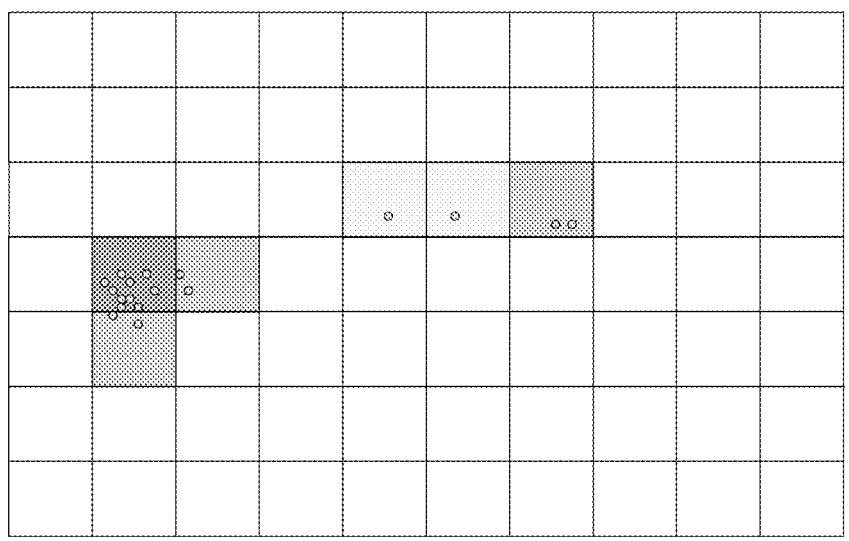

FIG. 2 below illustrates the various positions of the face of a given TV viewer.

Then, at the next time the matching algorithm is run, the detected face is first matched against the face of the person having the closest default position.

In an alternative solution, once a face is found, the centre of the face is placed on the grid and the matching algorithm will first try to match the face against the face of the TV viewer who has spent the longest time in the related square.

Thus, the steps relating to subsequent identification of persons could include further conditions stating that, in case no match could be established during the comparison of the extracted biometric data with the biometric data of the profile ID related to the current marking area, then this profile ID must be updated in case several same profiles have been detected successively.

In a another embodiment of the invention, we will strive to recognize the face of the primary TV viewer holding a remote control in order to provide a TV experience for this person. As a consequence, the face recognition is advantageously less computationally intensive compared to a multi-viewer scenario.

In the following, we will assume that TV device (Set Top Box, TV . . . ) is controlled with a remote control.

The primary user is characterized by the fact he/she holds the remote control to command the TV device and the remote control emits command signals which are usually Infra-Red light signals or Radio Frequency signals.

In case the remote control is a RF remote control or in case the sensitivity of the camera in the IR frequencies is too weak to detect the IR light, it may be necessary to add a dedicated beacon light to the remote control device Therefore, the remote control can be used as a beacon light to localize the primary user in the image or video captured by the camera when the user presses buttons of the remote control.

In case the remote control is based on IR light, the wavelength of this IR light is usually around 950 nm.

Figure 3:
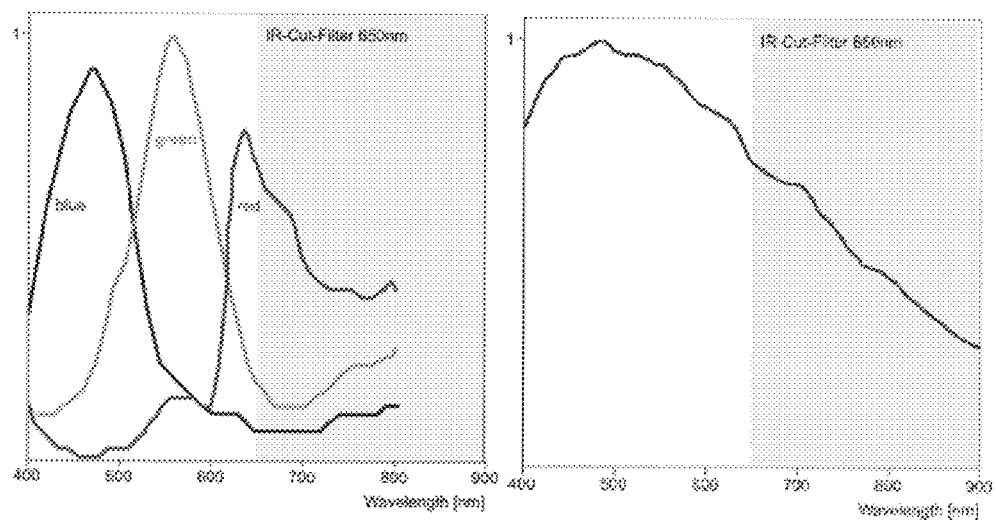

Standard cameras are usually equipped with an IR-cut filter mounted in front of the sensor in order to get rid of interferences due to sunlight, fluorescent bulbs. If the IR filter is removed to detect the remote control signal, we can notice in the graph below (see FIG. 3) that the intensity of the response spectrum is low at 950 nm.

Therefore, the impact of the remote control signal on the video may be too weak to be detected. In addition, another drawback is that the elimination of the IR filter may lead to a significant loss of image quality which is inconsistent with the face recognition requirements.

The proposed solution consists in using a remote control device which emits a light marker in the visible spectrum for which the camera sensor has a significant response. To avoid interference with ambient light and ease the detection of this light marker, the light wavelength may be in the blue range (around 465 nm) or near Ultra-Violet range (around 360 nm) since natural or artificial light source contain little blue light.

According to a possible embodiment, the camera can comprise an IR detector that is used to trigger the detection of the light marker. Since the remote will simultaneously emit an IR signal for the television and the light marker, the camera can acquire an image only when an IR signal is received, so that any light source having the same wave length as the light marker will not interfere with the light marker. In order to eliminate these interferences, it is possible to acquire an image after the end of the emission of the IR signal and the light marker, so that remaining light source having the same wave length as the light marker can be localized and removed for the analysis of the position of the light marker.

To this aim, the method of the present invention can also comprise the following steps:
  detecting the position of a signal emitted by the remote control within the wide image acquired by the camera,
  determining the distances between the signal's position and at least one marking area position memorized in the register identifying these marking areas,
  identifying the profile ID related to the marking area which corresponds to the shortest distance.

In the particular case where the process determines that two persons are located at the same distance from the remote control, or at very close distances, a solution aiming to determine who is the primary user among these two persons could take into account an additional parameter specified in the user's profiles, for instance a personal data informing that the person is left-handed or right handed.

Incidentally, and not necessarily in view of any particular case, other personal data could be taken into account in order to determine who is the primary user among the persons located in front of the camera. Such other personal data could be mother tongue of the user or his age within the framework of a parental control for example.

In addition, the assignment of the status of primary user could be dependent on a degree of priority recorded in the profile of the users. Therefore, a child could have a higher degree of priority than an adult, although the preceding steps of the process have assigned the position of the remote control to this adult.

To this aim, the method of the present invention could further comprise the steps of:
  comparing at least one personal data common to the found profile IDs, then
  assigning a degree of priority to at least one of these profile IDs on the basis of at least one predetermined criterion.

Typically, such a criterion could be based on the user's mother tongue or his age, such as a minimum age, or a combination of several additional personal data.

Alternatively, the remote control beacon light may be a second additional light which is dedicated to signal the position of the remote control in the scene, in addition to the existing IR light signal. In case the remote control communicates with the device using RF signals, this second option is necessarily used. This beacon light may be a permanent source or preferably a sporadic source which is emitted when someone presses a remote control button.

Since the TV device simultaneously receives a command from the IR or RF channel, it can inform the camera that the beacon light is present somewhere in the scene.

Figure 4:
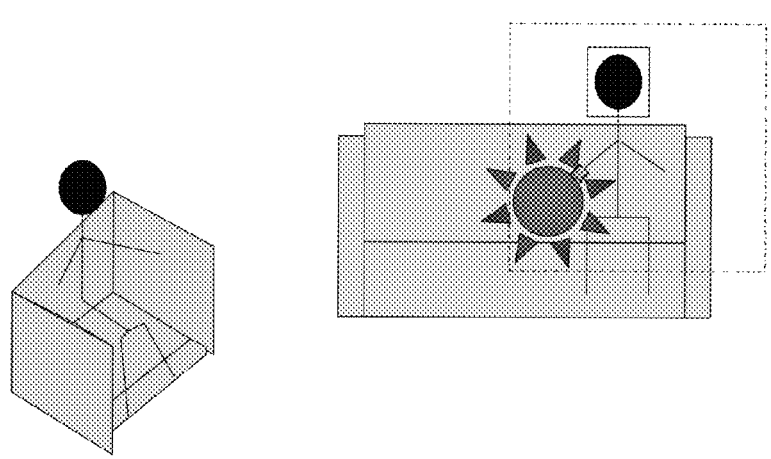

From the image analysis standpoint, the localization of the remote control light may be carried out by filtering the video baseband data to extract the Blue component which conveys most of the beacon signal emitted by the remote control. Then, once an intense blue light source is detected in the scene, the focus can be put on the corresponding image area as depicted in the FIG. 4 below:

It should be noticed that the focus area is actually the one used by face recognition algorithms to find a face. In case the camera sensor does not have a suitable resolution to carry out face recognition, it may be possible to use a variable lens and to control that lens and the camera itself with a motor to optically focus on the right area and project the focus area on the whole sensor.

In case the distance between TV viewers is too short and the face finder detects several faces in the focus area, a message may warn people that they are too close to identify the one who holds the remote control.

The invention claimed is:

1. A method to customize an application associated with a television experience based on the recognition of users located in front of a display and in the field of view of a camera, the method comprising:
  an initializing operation, during which each user is enrolled in a database of a computer system and is defined by a profile referenced by a profile ID, the profile comprising
    a user name,
    biometric data of said user acquired by said camera through a face recognition process, and
    additional personal data of said user;
  a finding operation, during which a wide image, acquired by said camera and embracing a wide area to encompass all potential users located in front of said display, is scanned in order to,
    isolate at least one user's face appearing on said wide image,
    define a marking area surrounding each isolated face,
    store the defined marking area as a fast scanning area image, and
    store the position of each of said marking areas in a register that identifies said marking areas;

a matching operation during which each marking area is processed using the stored positions in order to
extract biometric data of the face appearing inside a selected one of the marking areas from the fast scanning area image,
match said extracted biometric data with the biometric data of the profiles stored in the database, and assign the detected profile ID with the selected marking area, and
execute, while subsequent identification is requested by the application, the following operations,
acquiring a second wide image with the camera,
extracting from the second wide image an active area according to the selected marking area,
storing the extracted active area as a second fast scanning area image,
extracting the biometric data of a face from the second fast scanning area image,
starting the comparison of the extracted biometric data with the biometric data of the profile ID assigned to the selected marking area, and in absence of a match, continuing with the other biometric data of the database until one profile is found, and
transmitting the found profile ID to the application.

2. The method of claim 1, wherein in the case of absence of a match during the subsequent identification, updating the found profile ID related to the selected marking area.

3. The method of claim 1, wherein in the case of absence of a match during the subsequent identification, updating the found profile ID related to the selected marking area in case of a plurality of detections of the same profile ID.

4. The method of claim 1, further comprising:
detecting the position of a signal emitted by a remote control within said wide image,
determining the distances between the signal's position and at least one marking area position stored in said register,
identifying the profile ID related to the marking area which corresponds to the shortest distance.

5. The method of claim 1, further comprising:
comparing at least one personal data common to the found profile IDs, and
assigning a degree of priority to at least one of these profile IDs on the basis of at least one criterion.

6. The method of claim 4, wherein said signal is an Infra-Red light signal.

7. The method of claim 4, wherein said signal is a beacon signal specifically dedicated to signal the position of the remote control.

8. The method of claim 7, wherein said beacon signal has a wavelength in the blue range of a spectrum.

9. The method of claim 7, wherein said beacon signal has a wavelength in the near Ultra-Violet range of a spectrum.

10. The method of claim 7, wherein said beacon signal is an intermittent signal.

11. A device to provide a profile identifier ID of at least one user to an application associated with a television experience, comprising:
a database; and
at least one processor connected with a camera, the processor configured to execute an initialization operation during which each user is enrolled in the database of the device and is defined by a profile referenced by a profile ID, the profile comprising the following data,
a user name,
biometric data of said user acquired by said camera through a face recognition process, and
additional personal data of said user,
said at least one processor configured to execute,
a finding and matching operation during which a wide image, acquired by said camera and embracing a wide area to encompass all potential users located in front of said display, is scanned in order to,
isolate at least one user's face appearing on said wide image,
define a marking area surrounding each isolated face,
store the defined marking area as a fast scanning area image,
store the position of each of said marking areas in a register that identifies said marking areas,
extract biometric data of the face appearing inside a selected one of said marking areas from the fast scanning area image, and
match said extracted biometric data with the biometric data of the profiles stored in the database, and assign the detected profile ID with the selected marking area,
said at least one processor configured to, while subsequent identification is requested by the application, execute the following operations,
acquiring a second wide image with the camera,
extracting from the second wide image an active area according to the selected marking area,
storing the extracted active area as a second fast scanning area image,
extracting for the active area the biometric data of a face from the second fast scanning area image,
starting the comparison of the extracted biometric data with the biometric data of the profile ID assigned to the selected marking area, and in absence of a match, continuing with the other biometric data of the database until one profile is found,
transmitting the found profile ID to the application.

12. A method to customize an application associated with a television experience based on the recognition of users located in front of a display and in the field of view of a camera, the method comprising:
an initializing operation, during which each user is enrolled in a database of a computer system and is defined by a profile referenced by a profile ID, the profile comprising
a user name,
biometric data of the user acquired by the camera through a face recognition process,
location history information of the user corresponding to the field of view of the camera; and
additional personal data of the user;
a finding operation, during which a wide image, acquired by the camera and embracing a wide area to encompass all potential users located in front of the display, is scanned in order to,
isolate at least one user's face appearing on the wide image,
define a marking area surrounding each isolated face,
store the defined marking area as a fast scanning area image, and
store the position of each of the marking areas in a register that identifies the marking areas;
a matching operation during which each marking area is processed using the stored positions in order to extract biometric data of the face appearing inside a selected one of the marking areas from the fast scanning area image, match the extracted biometric data with the biometric data of the profiles stored in the database, and assign the detected profile ID with the selected marking area, and execute, while subsequent identification is requested by the application, the following operations,
- acquiring a second wide image with the camera,
- extracting from the second wide image an active area according to the selected marking area,
- storing the extracted active area as a second fast scanning area image,
- extracting the biometric data of a face from the second fast scanning area image,
- starting the comparison of the extracted biometric data with the biometric data of the profile ID assigned to the selected marking area, and in absence of a match, continuing with the other biometric data and the location history information in comparison with the stored position of the selected marking area of the database until one profile is found, and
- transmitting the found profile ID to the application.

* * * * *